United States Patent [19]
Sabath

[11] Patent Number: 5,500,744
[45] Date of Patent: Mar. 19, 1996

[54] METHOD AND APPPARATUS FOR IMAGE SCALING USING PARALLEL INCREMENTAL INTERPOLATION

[75] Inventor: Jerrold Sabath, Andover, Mass.

[73] Assignee: Miles Inc., Wilmington, Mass.

[21] Appl. No.: 286,302

[22] Filed: Aug. 5, 1994

[51] Int. Cl.$^6$ .................................................. H04N 1/405
[52] U.S. Cl. ........................... 358/456; 358/458; 358/466
[58] Field of Search .................................. 358/456, 457, 358/458, 460, 465, 466, 298, 536, 534, 535, 455; 382/270

[56] References Cited

U.S. PATENT DOCUMENTS 5,187,594  2/1993  Deutsch et al. ......................... 358/465

Primary Examiner—Scott A. Rogers
Attorney, Agent, or Firm—Richard J. Birch

[57] ABSTRACT

A method and apparatus for image scaling of continuous tone images to be rasterized and output to a recording or imaging device using incremental interpolation. The method employs multiple parallel interpolators, each of which contains an accumulation sum to which an accumulation constant is added. When each accumulation sum exceeds a reference value, a transition event is signaled, to be used for selection of contone image data value for processing. By initially loading the accumulation sums with shifted data and employing interpolation logic, multiple transition events can be calculated within one output resolution processing cycle.

29 Claims, 10 Drawing Sheets

METHOD AND APPPARATUS FOR IMAGE SCALING USING PARALLEL INCREMENTAL INTERPOLATION

BACKGROUND OF THE INVENTION

The field of the invention is the reproduction of continuous tone images in the graphic arts electronic prepress environment. Continuous tone images, hereinafter referred to as "contone images", represent photographs and artwork as well as tints and degrades, and are characterized by image tones which can take on a continuous range of values. Contone images are typically stored in digital processing systems as one or more 8-bit bytes for each resolution element (i.e., each pixel) of the original image, with a single byte per pixel used to represent a monochrome image, and two or more bytes per pixel if color information is retained.

Reproduction of contone images in an output medium provides special problems in that many reproduction methods are capable of producing only a small number of image tones. In the case of offset printing, for example, there are only two stable tones, corresponding to the presence or absence of ink at any point on the output medium. In order to produce the visual effect of variable densities, the actual contone data values representing an image are converted into a spatial distribution of binary dots that can be printed, a process known in the art as "halftoning", or "halftone screening".

In a typical halftoning procedure, a contone image is rendered by comparing the contone data value at each individual resolution element of the recorder device to a reference value with the result being "black" if greater than the reference value and "white" otherwise. As used herein, the terms "black" and "white" refer to the presence or absence of ink on the printed output respectively. The reference values are spatially distributed within a repeating array referred to as a "threshold value array", or as a "threshold screen tile", according to a pattern determined by the halftone screening technique being used (e.g., "dot-size modulation" screening or "dot-frequency modulation" screening).

For high-quality graphic output, the reproduction device is typically a digital film recorder employing a scanning laser beam that exposes a photosensitive material at high resolution, usually 1200 dots per inch (dpi) or higher. The resolution of a contone image to be output is typically in the vicinity of 400 dpi (e.g., the input scanning resolution of a photograph). The halftoning process becomes one of projecting a spatial density distribution at a relatively low frequency (the contone image) upon another at the higher output spatial frequency distribution (the threshold values). In the above example, three output resolution elements are processed for each contone image pixel. This process is referred to as "image scaling", and typically takes place within the halftone screening subsystem of a raster image processor ("RIP").

Due to the demand for ever higher quality output and higher rates of production (system throughput) within the graphic arts electronic prepress environment, the processing performance demands of a halftone screening subsystem continue to increase. The throughput limitations placed by the image scaling process determine, to a large extent, the overall performance of an image reproduction system. This is due to the fact that the threshold comparison process must be carried out once for each resolution element of the output device. Doubling the resolution of the output device therefore has the effect of quadrupling the number of thresholding operations required for a given output image size. Acceleration techniques which minimize the processing time per output resolution element, including the image scaling processing time, have a direct impact on the utility of a halftoning system, and have been the subject of considerable investigation in the art.

A primary method for image scaling used in halftone screening is incremental interpolation, whereby dimensional units having a given frequency are interpolated to units of the same dimension having a higher frequency by incremental accumulation of the higher frequency (smaller dimensional) units, until the running sum of the accumulated units exceeds a fixed reference value (hereinafter called the "transition value") marking transition to the next dimensional unit of the lower frequency. In the application of incremental interpolation to image scaling, a running sum is maintained in an internal register, referred to as an "accumulation sum", to which a fixed "accumulation constant" is added for each processing cycle (corresponding to one output resolution element), When the accumulation sum reaches the transition value, a "transition event" is signaled, and the accumulation sum is reset by subtracting the transition value. For image scaling, the fixed constant represents the spatial dimension of an output resolution element, and the transition event indicates transition to another pixel of the contone image. Typically, an integer adder of N bits is used, configured such that the transition corresponds to $2^N$, implying a fixed binary point to the left of the most significant bit, with the fixed constant normalized accordingly. In this configuration therefore, the "transition event" is the output carry bit indicating overflow of the most significant bit of the adder.

The method described above, hereinafter referred to as "single incremental interpolation", has the advantage of maintaining the correct relative positioning between the high and low resolution domains, including provision for an initial phase shift (determined by the starting value of the accumulation sum), minimum interference effects between the low and high spatial frequencies (as compared for example to schemes dependent upon subdivision of a fundamental frequency), and for relative simplicity of implementation. It has the disadvantage of lengthening the hardware processing cycle and is therefore potentially slow.

The factor limiting the performance of the incremental interpolation method is the delays within each accumulation sum due to such effects as internal carry propagation. Methods aimed at minimizing this delay in adders and accumulators are well known in the art, and include such techniques such as carry-look-ahead, carry-save, and carry-select. One such method, referred to herein as "pipelined serial interpolation", eliminates internal carry propagation, giving a speed enhancement of a factor of N for an N-bit word. Speed enhancements over and above those described above require parallel processing of more than one output resolution element at the same time, and are heretofore unknown in the art.

It is therefore a general object of the invention to provide enhanced data processing throughput in a raster image processor.

It is a specific object of the invention to provide enhanced data processing throughput in a raster image processor by maximizing the speed of incremental interpolation used in image scaling.

It is a still further specific object of the invention to provide parallel processing of more than a single output resolution element within a single unit of processing time.

SUMMARY OF THE INVENTION

The invention achieves processing speed enhancement by performing multiple interpolations in parallel, using logic circuitry for calculating multiple accumulation sums and multiple transition events within a single clock cycle, and for interpretation of these transition events to provide correct control for the scaling operation. The logic circuitry uses multiple incremental interpolators which share a common accumulation constant but which have independent interpolators. By initially loading the accumulation sums with shifted data, and by including appropriate interpretation logic, multiple transition events can be calculated in a single clock interval.

Using the method and apparatus of the invention, the data processing throughput realizable by M multiple pipelined serial interpolators can in principle be increased by a factor of M. A preferred embodiment of the invention using a pair of parallel processors produces results which are identical to those obtained with conventional interpolation and scaling techniques but with double the throughput.

BRIEF DESCRIPTION OF THE DRAWINGS

The objects and features of the invention will best be understood from a detailed description of the invention and a preferred embodiment thereof selected for the purposes of illustration and shown in the accompanying drawings in which.

DETAILED DESCRIPTION OF THE INVENTION

Figure 1:
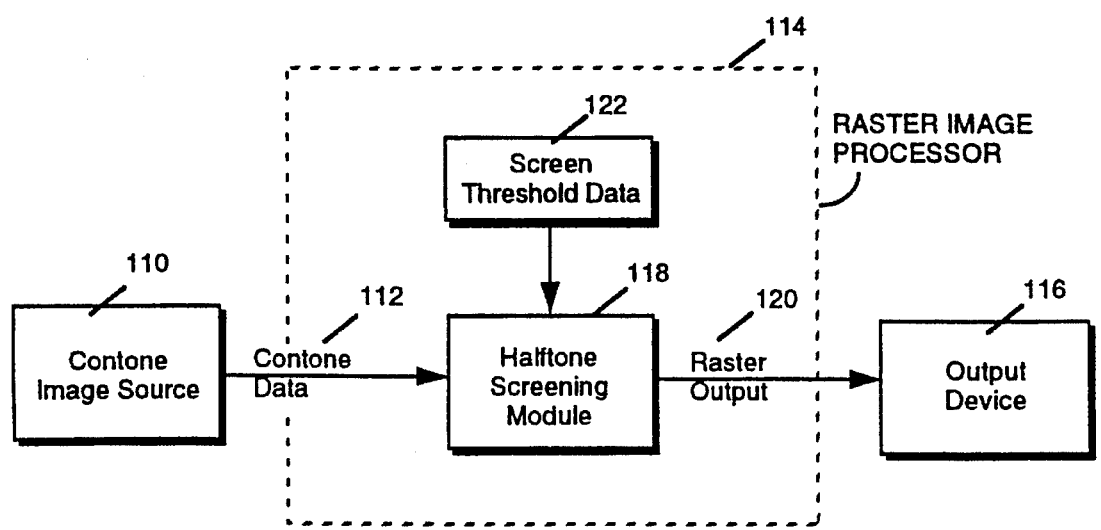
FIG. 1 shows a system context diagram for the invention.

Turning now to the drawings, FIG. 1 provides an overview of the application environment for the invention. A contone image source 110, such as a computer program, generates contone images which are transferred as a data stream 112 for processing by a RIP 114 and sent to an output device 116 which is typically a recording or imaging device. The RIP 114 comprises among other components a halftone screening module 118 whose function is to convert the contone data 112 to a rasterized output form 120 for transmission to the output device 116, making use of screen threshold data 122. The rasterized output 120 can also be stored internally for later use and/or output.

Figure 2:
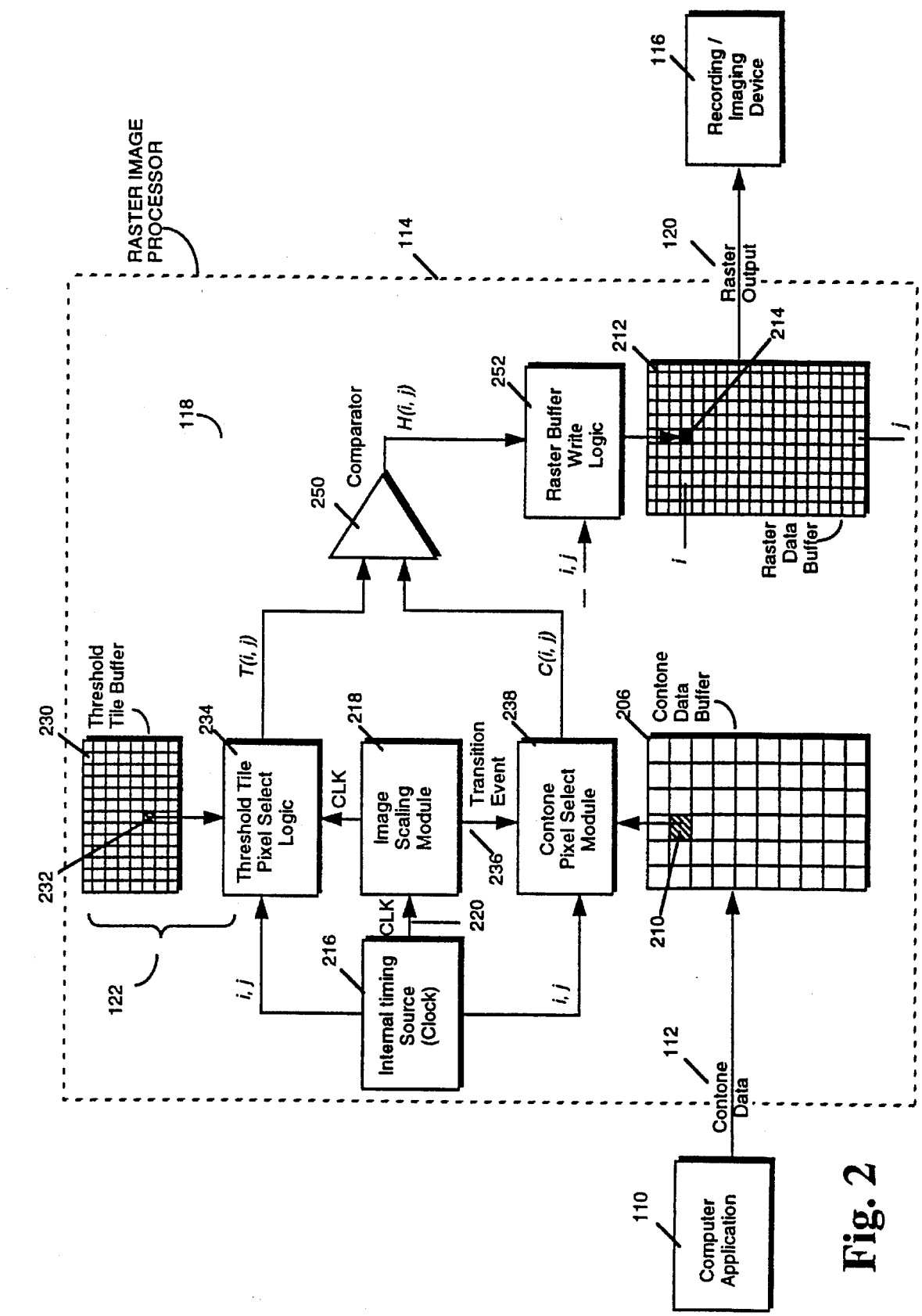
FIG. 2 shows an expanded view of the halftone screening subsystem of a RIP system.

FIG. 2 shows an expanded view of the diagram of HG. 1, in which the major modules of the halftone screening module 118 and the screen threshold data 122 are shown in block diagram form. The contone data 112 is stored in a contone data buffer 206 in a form such that data for each pixel 210 of the image can be accessed for processing. A second data buffer 212 contains the rasterized data representing the data to be output 120 as an array of addressable output resolution elements 214 typically arranged in rows and columns and accessible by an address (i, j) where i is a row index and j a column index. An internal timing source 216 controls the processing sequence, generating a timing signal (CLK) 220 and new address (i, j) at each clock interval, and activating the image scaling module 218. The screen threshold data 122 comprises a threshold tile buffer 230 containing a spatial distribution of screening threshold values 232 to be used for determining the output of the halftoning process and a logic unit 234. The logic unit 234 selects each appropriate threshold value 232 from the threshold tile buffer 230 according to the address value (i, j) of the output resolution element 214 being processed.

When the image scaling module 218 receives the clock signal CLK from the internal timing source 216, it performs one iteration of incremental interpolation, signals the threshold pixel select logic 234 to select one or more threshold tile values 232 from the threshold tile buffer 230, and uses transition events 236 if any to signal a contone pixel select module 238 to select contone data values 210 from the contone data buffer 206.

For each output resolution element (i, j) processed, a threshold value T(i, j) is obtained by the threshold pixel select logic 234, and compared in comparator 250 with a contone data value C(i, j) obtained from the contone pixel select module 238 to produce a result H(i, j) which is logically a "1" or "0" (representing "black" or "white" respectively) depending upon whether or not the value C(i, j) exceeds the screen threshold value T(i, j). With the completion of each clock cycle, the resulting values H(i, j) are written by raster buffer write logic 252 to the output resolution element 214 given by the address (i, j) of the raster data buffer 212.

Figure 3:
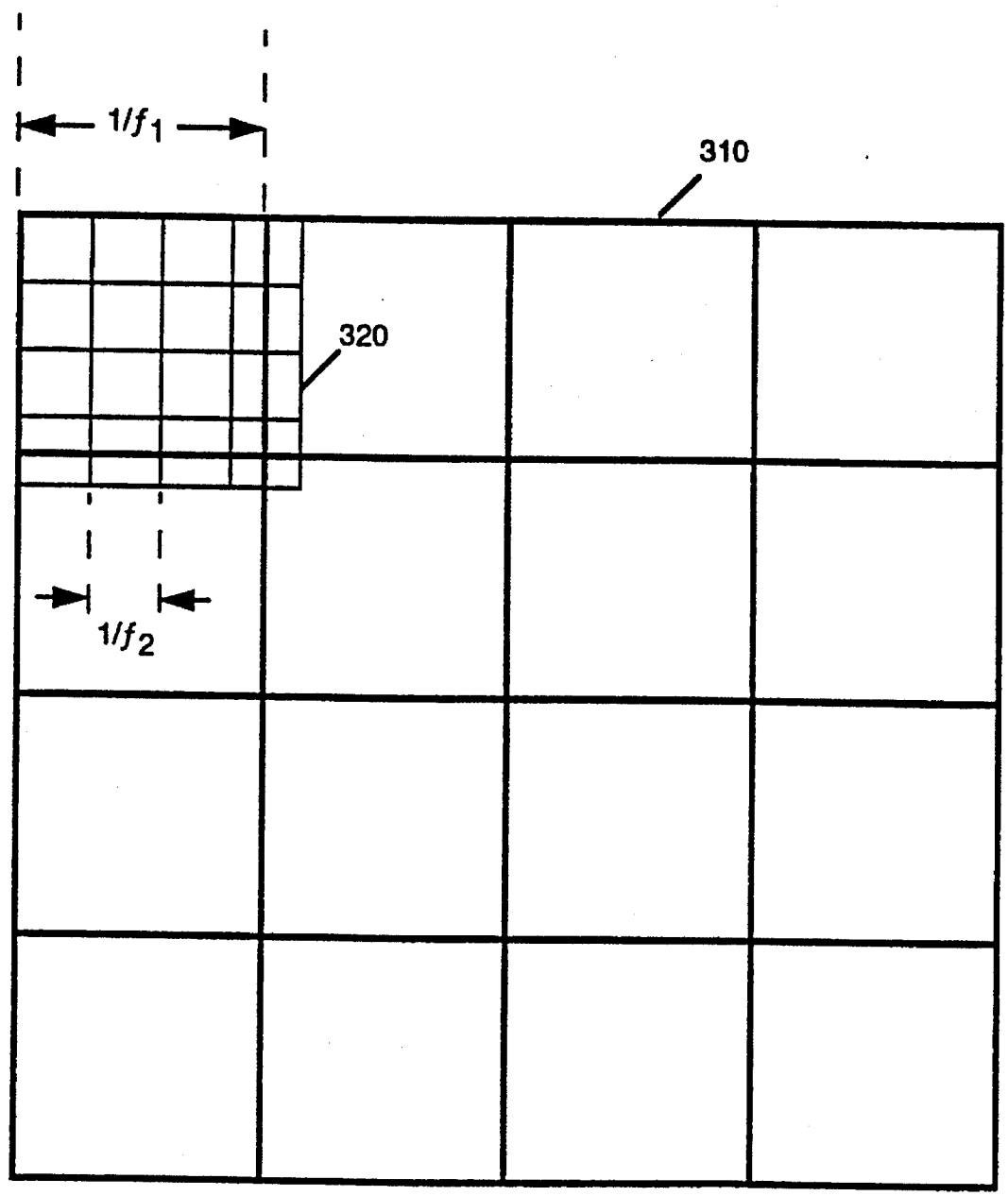
FIG. 3 illustrates image scaling as a spatial frequency synthesis problem.

The processing described above can be seen as the generation of a sequence of elements at given frequency $f_1$ from a sequence occurring at another frequency $f_2$ which is greater than the first. This is illustrated in FIG. 3 in which an array of contone pixels 310 is shown superimposed on the higher frequency array of output resolution elements 320. Accordingly, the elements at a relatively low spatial frequency $f_1$ (the pixels of the contone image) are selected according to the elements at a higher spatial frequency $f_2$ (the screen threshold values referenced to the raster data buffer). The essential function of the image scaling module 218 is to ensure that the correct low frequency element is matched with each element of the higher frequency distribution as it is processed.

Defined Terms

As an aid to understanding the discussion to follow, the terms defined herein apply to the following text and claims, and are indicated by small capitalization.

An OUTPUT DEVICE is a device to which a raster data stream, representing a graphic image or a page description, is output on a medium such as film.

A CONTONE IMAGE is a continuous tone image which is to be rendered for output to an OUTPUT DEVICE.

A CONTONE DATA VALUE is a value assigned to an element of a CONTONE IMAGE corresponding to a single tone value of the image for that element.

A PIXEL is a single element of an image stored digitally. The digital representation of a CONTONE IMAGE is an array of elements, referred to as CONTONE PIXELS for each of which one or more CONTONE DATA VALUES is defined. Typically, CONTONE DATA VALUES are represented as 8-bit data bytes, thereby taking on integer values on the range from 0 to 255.

The CONTONE RESOLUTION is the resolution of a CONTONE IMAGE in dots per inch (dpi). The CONTONE RESOLUTION is usually that at which the image was originally converted to digital form by scanning.

The OUTPUT RESOLUTION is the resolution of a rasterized graphic image or page description, corresponding to the resolution of an OUTPUT DEVICE to which it is intended to be output.

IMAGE SCALING is the process of representation of a CONTONE IMAGE at an OUTPUT RESOLUTION which can be less than, equal to, or greater than the CONTONE RESOLUTION of the CONTONE IMAGE.

The SCALE FACTOR is the ratio of the dimensional unit of a first frequency to that of a second frequency. For IMAGE SCALING, the SCALE FACTOR is the ratio of the CONTONE RESOLUTION to the OUTPUT RESOLUTION.

An ACCUMULATION SUM is the result of repeated incremental accumulation of a constant value, referred to as the ACCUMULATION CONSTANT.

The ACCUMULATION CONSTANT is the constant value to be added iteratively to an ACCUMULATION SUM to obtain a new ACCUMULATION SUM.

The TRANSITION VALUE is a reference value to which an ACCUMULATION SUM is compared to determine whether or not a transition has occurred from one CONTONE PIXEL to the next. A TRANSITION EVENT occurs when the ACCUMULATION SUM becomes greater than or equal to the TRANSITION VALUE, thereby indicating that such a transition has occurred.

A HALFTONE PIXEL is a single element of an output graphic image or page description to be output to an OUTPUT DEVICE with a given OUTPUT RESOLUTION.

A HALFTONE DATA VALUE is a value assigned to a HALFTONE PIXEL of an output image or page, typically "1" or "0" representing the presence or absence of ink as printed on an output medium (referred to herein as "black" or "white").

A THRESHOLD PIXEL is a single element of threshold screening data used in comparison with CONTONE DATA VALUE to determine a HALFTONE DATA VALUE for the HALFTONE PIXEL corresponding to the THRESHOLD PIXEL.

A THRESHOLD DATA VALUE is a value assigned to a THRESHOLD PIXEL.

HALFTONE PROCESSING is the process whereby each HALFTONE PIXEL is assigned a HALFTONE DATA VALUE depending upon whether or not a CONTONE DATA VALUE corresponding to a CONTONE PIXEL at the same image location is greater than a THRESHOLD DATA VALUE corresponding to the same location.

Single Incremental Interpolation

The process of incremental interpolation is illustrated for the example of FIG. 3 in TABLE 1, in which the initial value of the ACCUMULATION SUM is 0, the ACCUMULATION CONSTANT corresponding to each high resolution element is 1, and the TRANSITION VALUE is 3.5. In the table, a sequence of clock cycles, t=0, 1, 2, . . . cause successive iterations of the incremental accumulation, with each TRANSITION EVENT occurring when the ACCUMULATION SUM reaches the TRANSITION VALUE 3.5. Note that at the starting time t=0, the data for the first THRESHOLD PIXEL T(0) is used with the first CONTONE PIXEL C(0) to yield the first HALFTONE PIXEL H(0).

TABLE 1

INCREMENTAL INTERPOLATION WITH TRANSITION VALUE = 3.5 RESOLUTION UNITS

| Clock Cycle t | Accumulation Sum | Transition Event | Threshold Pixel | Contone Pixel | Halftone Pixel |
| --- | --- | --- | --- | --- | --- |
| 0 | 0 |  | T(0) | C(0) | H(0) |
| 1 | 1 |  | T(1) | C(0) | H(1) |
| 2 | 2 |  | T(2) | C(0) | H(2) |
| 3 | 3 |  | T(3) | C(0) | H(3) |
| 4 | 4 –> 0.5 | ✓ | T(4) | C(1) | H(4) |
| 5 | 1.5 |  | T(5) | C(1) | H(5) |
| 6 | 2.5 |  | T(6) | C(1) | H(6) |
| 7 | 3.5 –> 0 | ✓ | T(7) | C(2) | H(7) |
| 8 | 0 |  | T(8) | C(2) | H(8) |
| : | : | : | : | : | : |

At the end of the first iteration t=1, the ACCUMULATION SUM is 1. Since this is less than the TRANSITION VALUE, the THRESHOLD PIXEL VALUE T(1) is used with the first CONTONE PIXEL C(0) to yield the HALFTONE PIXEL H(1). Similar results obtain for clock cycles 2 and 3. In the fourth clock cycle, the ACCUMULATION SUM becomes 4, exceeding the TRANSITION VALUE and signaling a TRANSITION EVENT. The ACCUMULATION SUM is adjusted by subtracting the TRANSITION VALUE, and the TRANSITION EVENT is used to select the next CONTONE DATA VALUE, in this case C(1). For this clock cycle, therefore, the fourth THRESHOLD PIXEL VALUE T(4) is used with the second CONTONE DATA VALUE C(1) to yield the fourth HALFTONE DATA VALUE H(4).

Figure 4:
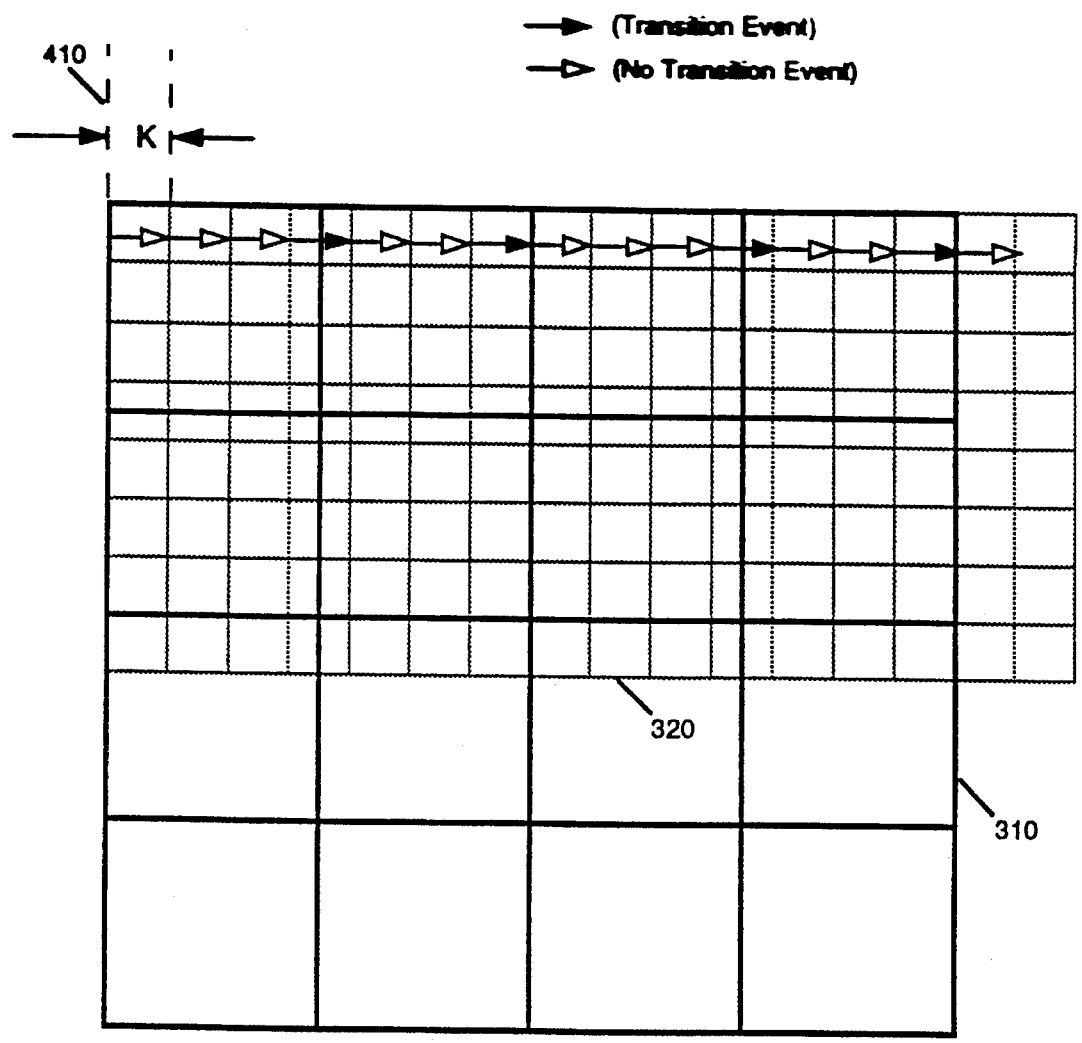
FIG. 4 shows the process of single incremental interpolation as a sequence of vector additions.

The process of TABLE 1 is depicted in symbolic form in FIG. 4 in which each iteration adds an ACCUMULATION CONSTANT K 410 and displaces the result to the right by one element of the high resolution distribution. Each step is indicated in the figure by a vector with a closed head if a TRANSITION EVENT occurs at the end of the step, and an open head otherwise. Since subdivision of the high resolution elements is not possible, a cumulative phase error exists (except for integer subdivisions of the low resolution elements) which is automatically corrected such that the average number of high resolution elements per low resolution element approaches the ratio of $f_2/f_1$ of FIG. 3, and that the phase relationship between the high and low resolution distributions is maintained correctly over a extended range to within one high resolution element. This is demonstrated in FIG. 4 by the fact that, after the first TRANSITION EVENT, the number of high frequency elements assigned to each low frequency element alternates between 3 and 4, thereby giving the correct ratio of 3.5, and average phase relationship of 0.

An approach to single incremental interpolation which is more efficient than that of shown in TABLE 1 is to normalize the ACCUMULATION CONSTANT and TRANSITION VALUE to a power of 2 (2n), where n is less than or equal to the number of bits N of the (binary) word storing the ACCUMULATION SUM. This has the effect of setting an implied (fixed) binary point to the left of the nth bit, i.e., taking the TRANSITION VALUE to be unity and the ACCUMULATION CONSTANT an appropriately-scaled fraction. TABLE 2 shows the example of TABLE 1 with the TRANSITION VALUE=1 and the ACCUMULATION CONSTANT=1/3.5=0,286.

The most computationally efficient implementation for a single incremental interpolator occurs when n=N, since the implied binary point is to the left of the most significant bit (MSB) of the ACCUMULATION SUM, and the TRANSITION EVENT is signaled by overflow into the carry bit. In this case, the subtraction of the TRANSITION VALUE is accomplished automatically upon resetting of the carry bit (leaving the residual in the N bits of the ACCUMULATION SUM, properly initialized for the following iteration).

An additional point to note is that the single incremental interpolation method can be used as described above for IMAGE SCALING for any value of the SCALE FACTOR less than or equal to one. This is nearly always the case for applications involving high-resolution output, i.e., wherein the method of the invention is particularly useful.

Dual Incremetal Interpolation

The objective of dual incremental interpolation is to process two high resolution elements within a single clock cycle, thereby achieving a factor of two increase in processing throughput over that using single incremental interpolation. This is achieved by offsetting the initial accumulation sum values by a single high resolution element, and using an accumulation constant K which corresponds to two high resolution elements. After startup, one interpolator computes HALFTONE DATA VALUES for the even numbered elements (0, 2, 4, 6, . . . ) and the other computes them for the

TABLE 2

INCREMENTAL INTERPOLATION WITH NORMALIZED TRANSITION VALUE

| Clock Cycle t | Accumulatior Sum | Transition Event | Threshold Pixel | Contone Pixel | Halftone Pixel |
|---|---|---|---|---|---|
| 0 | 0.000 | | T(0) | C(0) | H(0) |
| 1 | 0.286 | | T(1) | C(0) | H(1) |
| 2 | 0.571 | | T(2) | C(0) | H(2) |
| 3 | 0.857 | | T(3) | C(0) | H(3) |
| 4 | 1.143 -> | ✓ | | | |
| | 0.143 | | T(4) | C(1) | H(4) |
| 5 | 0.429 | | T(5) | C(1) | H(S) |
| 6 | 0.714 | | T(6) | C(1) | H(6) |
| 7 | 1.000 -> | ✓ | | | |
| | 0.000 | | T(7) | C(2) | H(7) |
| 8 | 0.286 | | T(8) | C(2) | H(8) |
| : | : | : | : | : | : |

Figure 5:
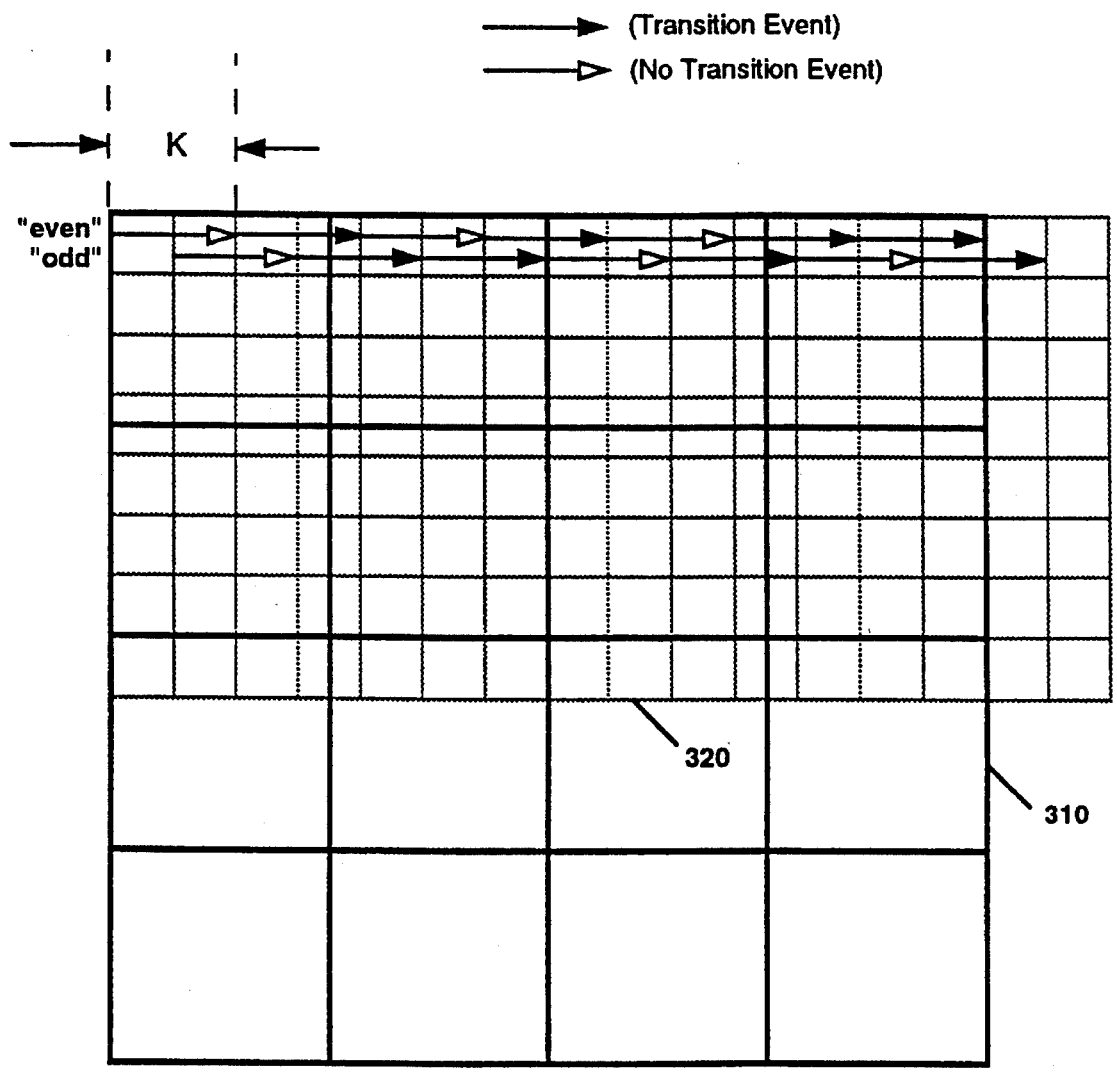
FIG. 5 shows the process of dual incremental interpolation in the vector addition format of FIG. 4.

In this case, the overflow beyond the nth bit is used to signal the TRANSITION EVENT, and the adjustment of the TRANSITION VALUE is accomplished by merely resetting bits to the left of the implied binary point.

odd elements (1, 3, 5, . . . ). FIG. 5 uses the vector notation of FIG. 4 to show this process, and results for the first 8 clock cycles are shown in TABLE 3, using the data of the previous example (see TABLE 1).

TABLE 3

DUAL INCREMENTAL INTERPOLATION WITH TRANSITION VALUE = 3.5

| Clock | EVEN | | | ODD | | |
|---|---|---|---|---|---|---|
| t | Sum | Event | Pixels | Sum | Event | Pixels |
| 0 | 0.0 | | T(0), C(0) | 1.0 | | T(1), C(0) |
| 1 | 2.0 | | T(2), C(0) | 3.0 | | T(3), C(0) |
| 2 | 4.0 -> 0.5 | ✓ | T(4), C(1) | 5.0 -> 1.5 | ✓ | T(5), C(1) |

TABLE 3-continued

| | DUAL INCREMENTAL INTERPOLATION WITH TRANSITION VALUE = 3.5 | | | | | |
|---|---|---|---|---|---|---|
| Clock | EVEN | | | ODD | | |
| t | Sum | Event | Pixels | Sum | Event | Pixels |
| 3 | 2.5 | | T(6), C(1) | 3.5 -> 0.0 | ✓ | T(7), C(2) |
| 4 | 4.5 -> 1.0 | ✓ | T(8), C(2) | 2.0 | | T(9), C(2) |
| 5 | 3.0 | | T(10), C(2) | 4.0 -> 0.5 | ✓ | T(11), C(3) |
| 6 | 5.0 -> 1.5 | ✓ | T(12), C(3) | 2.5 | | T(13), C(3) |
| 7 | 3.3 -> 0.0 | ✓ | T(14), C(4) | 4.5 -> 1.0 | ✓ | T(15), C(4) |
| 8 | 2.0 | | T(16), C(4) | 3.0 | | T(17), C(4) |
| : | : | : | : | : | : | : |

The operation for each interpolator is seen to correspond to that of the example of TABLE 1 with the exception that in any clock cycle t=0, one or two TRANSITION EVENTS may occur. These must be correctly interpreted to select one of two CONTONE PIXELS $C_{even}(t)$ and $C_{odd}(t)$ for the pair of THRESHOLD PIXELS $T_{even}(t)$ and $T_{odd}(t)$.

Normalization of the ACCUMULATION CONSTANT K and the TRANSITION VALUE can be accomplished in a manner similar to that for the single incremental interpolator. In the case of the example, the TRANSITION VALUE= 1, the SCALE FACTOR=⅓.₅, the ACCUMULATION CONSTANT is twice the SCALE FACTOR (since it corresponds to two high resolution elements), giving K=⅔.₅=0.572. The results are shown in TABLE 4.

TABLE 4

| | DUAL INCREMENTAL INTERPOLATION WITH NORMALIZED TRANSITION VALUE | | | | | |
|---|---|---|---|---|---|---|
| Clock | EVEN | | | ODD | | |
| t | Sum | Event | Pixels | Sum | Event | Pixels |
| 0 | 0.000 | | T(0), C(0) | 0.286 | | T(1), C(0) |
| 1 | 0.571 | | T(2), C(0) | 0.857 | | T(3), C(0) |
| 2 | 1.143 -> 0.143 | ✓ | T(4), C(1) | 1.429 -> 0.429 | ✓ | T(5), C(1) |
| 3 | 0.715 | | T(6), C(1) | 1.000 -> 0.000 | ✓ | T(7), C(2) |
| 4 | 1.286 -> 0.286 | ✓ | T(8), C(2) | 0.571 | | T(9), C(2) |
| 5 | 0.857 | | T(10), C(2) | 1.143 -> 0.143 | ✓ | T(11), C(3) |
| 6 | 1.429 -> 0.429 | ✓ | T(12), C(3) | 0.715 | | T(13), C(3) |
| 7 | 1.000 -> 0.000 | ✓ | T(14), C(4) | 1.286 -> 0.286 | ✓ | T(15), C(4) |
| 8 | 0.571 | | T(16), C(4) | 0.857 | | T(17), C(4) |
| : | : | : | : | : | : | : |

An additional problem seen for the dual incremental interpolation method is the overflow beyond twice the TRANSITION VALUE in the event that the ACCUMULATION CONSTANT K exceeds 1. This would occur for any SCALE FACTOR greater than ½. Although the problem could be avoided by simply limiting CONTONE RESOLUTIONS such that this SCALE FACTOR value is never exceeded, a better solution results from shifting all data values to the right by one bit, i.e., dividing the INITIAL ACCUMULATION SUMS, the ACCUMULATION CONSTANT K, and the TRANSITION VALUE by two. This is possible without introducing additional (cumulative) errors because before the shift to the right, the least significant bit of the ACCUMULATION CONSTANT K is always zero (since it is twice the SCALE FACTOR).

Scaling the sum values has the effect of shifting the binary point to the right one bit. If the binary point would otherwise be to the left of the MSB of the ACCUMULATION SUM, it is now located to the right of the MSB, and the TRANSITION EVENT is signaled by overflow into or beyond the MSB. The TRANSITION EVENT condition can be expressed as:

$$E(t)=\text{Int}(S(t)/2^{N-1}) \neq 0 \quad [1]$$

where S(t) is an ACCUMULATION SUM at clock cycle t, N is the number of bits in the binary register containing the ACCUMULATION SUM, and the event condition E(t) is non-zero if a TRANSITION EVENT has occurred and zero otherwise. The adjustment of the sum S(t) after occurrence of a TRANSITION EVENT is then:

$$S(t) \rightarrow S(t) \bmod 2^{N-1} \quad [2]$$

Accordingly, for an implementation having 16-bit integer ACCUMULATION SUMS, given a SCALE FACTOR F determined from the ratio of the CONTONE RESOLUTION to the OUTPUT RESOLUTION, the initial values of the two sums $S_{EVEN}(0)$ and $S_{ODD}(0)$ are given by:

$$S_{EVEN}(0)=S_0/2 \quad [3]$$

$$S_{ODD}(0) = (S_0 + K)/2$$

$$K = (2*F)/2 = F \quad (0 \leq F < 1)$$

where $S_0$ is an initial offset ($0 \leq S_0 \leq F$) representing the alignment of the low resolution grid and the high resolution grid. The update of the sums for a given clock cycle t, where t=1, 2, . . . is given by:

$$S_{EVEN}(t) = S_{EVEN}(t-1) + K \quad [4]$$

$$S_{ODD}(t) \leq S_{ODD}(t-1) + K$$

The TRANSITION EVENT conditions $E_{EVEN}(t)$ and $E_{ODD}(t)$ are given by:

$$E_{EVEN}(t) = \text{Int}(S_{EVEN}(t)/2^{15}) \neq 0 \quad [5]$$

$$E_{ODD}(t) = \text{Int}(S_{ODD}(t)/2^{15}) \neq 0$$

and the adjustment after a TRANSITION EVENT by:

$$S_{EVEN}(t) \rightarrow S_{EVEN}(t) \bmod 2^{15}$$

or $$S_{ODD}(t) \rightarrow S_{ODD}(t) \bmod 2^{15}$$

Extension to Multiple Incremental Interpolators

The above analysis can be extended formally to multiple incremental interpolation with an arbitrary number M of interpolators. In the general case, the overflow condition described for the dual interpolator occurs for any SCALE FACTOR in excess of 1/M. Shifting the binary point to the right to accommodate the overflow can be used, as in the dual incremental interpolator case. In this case, however, precision is lost unless M is a power of 2.

Considering the case for generalized $M = 2^i$ where $0 \leq i \leq N$, the binary point is shifted a number of bits i to the right, and the equations given for the dual interpolator case can be written in general form for M interpolators, with indices m=0, 1, . . . , M-1, and ACCUMULATION SUMS $S_0(t), S_1(t), \ldots, S_{M-1}(t)$. The INITIAL ACCUMULATION SUMS are given by:

$$S_0(0) = S_0/M \quad [7]$$
$$S_1(0) = (S_0 + K)/M$$
$$S_2(0) = (S_0 + 2*K)/M$$
$$\vdots$$
$$S_{M-2}(0) = (S_0 + (M-2)*K)/M$$
$$S_{M-1}(0) = (S_0 + (M-1)*K)/M$$
$$K = (M * F)/M = F$$

The update of the sums for a given clock cycle t, where t=1, 2, . . . is given by:

$$S_0(t) = S_0(t-1) + K \quad [8]$$
$$S_1(t) = S_1(t-1) + K$$
$$\vdots$$
$$S_{M-1}(t) = S_{M-1}(t-1) + K$$

The TRANSITION EVENT conditions are given by:

$$E_0(t) = \text{Int}(S_0(t)/2^i) \neq 0 \quad (i = N - \log_2 M) \quad [9]$$
$$E_1(t) = \text{Int}(S_1(t)/2^i) \neq 0$$
$$\vdots$$
$$E_{M-1}(t) = \text{Int}(S_{M-1}(t)/2^i) \neq 0$$

and the adjustment after a TRANSITION EVENT occurring for the mth interpolator by:

$$S_m(t) \rightarrow S_m(t) \bmod 2^i \quad [10]$$

Image Scaling Data Selection

In application of parallel incremental interpolation to IMAGE SCALING, the TRANSITION EVENTS occurring within each interpolator must be interpreted to obtain the correct CONTONE PIXEL for use with each THRESHOLD PIXEL. In a parallel processing scheme, these contone pixels are not selected in a strictly sequential order, as can be seen from the data of TABLE 3 and TABLE 4. Accordingly, the complexity of the interpretation circuitry can be expected to increase as the number M of parallel interpolators increases.

One method for identification and selection of the CONTONE PIXEL for processing is to add the value $E_m(t)$ obtained in a TRANSITION EVENT of the mth interpolator to a CONTONE PIXEL data register for that interpolator, containing the address of the CONTONE DATA VALUE to be used in the screening process. This approach has the benefits of logical simplicity obtained from the independence of each interpolator, and the ability to handle the overflow case $E_m(t) > 2$. It has the disadvantages of requiring a separate address register for each interpolator and a data fetch operation for each TRANSITION EVENT, whether or not a new CONTONE PIXEL is needed.

In another approach, used in the preferred embodiment of the invention, each interpolation generates a TRANSITION EVENT corresponding to the equivalent TRANSITION EVENT occurring in the single interpolator case. In other words, a TRANSITION EVENT in the mth interpolator indicates that a new CONTONE PIXEL is needed relative to that required by the previous (m−1th) interpolator. If the mth interpolator does not generate a TRANSITION EVENT, then the CONTONE PIXEL used by the m-1th interpolator should be used again by the mth interpolator.

The approach involves keeping track of the overflow bit from the previous interpolator of the set, with the first using the overflow bit of the last interpolator in the previous iteration, giving, for the general case of M interpolators the modified TRANSITION EVENT conditions (replacing those of equation [9]):

$$E_0(t) = S_0[i](t) \cdot \text{XOR} \cdot S_{M-1}[i](t-1) \neq 0 \quad (i = N - \log_2 M) \quad [11]$$

$$E_1(t) = S_1[i](t) \cdot \text{XOR} \cdot S_0[i](t) \neq 0$$

$$\vdots$$

$$E_{M-1}(t) = S_{M-1}[i](t) \cdot \text{XOR} \cdot S_{M-2}[i](t) \neq 0$$

where $S_m[i](t)$ is the ith bit of the mth ACCUMULATION SUM $S_m(t)$ at the end of the clock cycle t. Note that in this case no further adjustment of the sums is required.

The advantage of this approach is that each interpolator can still handle any SCALE FACTOR less than 1 without incurring the overflow condition described previously. Furthermore, there is a direct correlation between M=1 TRANSITION EVENTS and M>1 TRANSITION EVENTS. The disadvantages are that the calculation of the mth TRANSITION EVENT uses parallel consideration of two interpolator results instead of one, so that the decoding associated with the pixel selection logic can become complex as M increases. In the case of a dual incremental interpolator (M=2), as used in the preferred embodiment of the invention, this decoding process is relatively simple, as will be seen in the following description.

Processing Sequence

Figure 6:
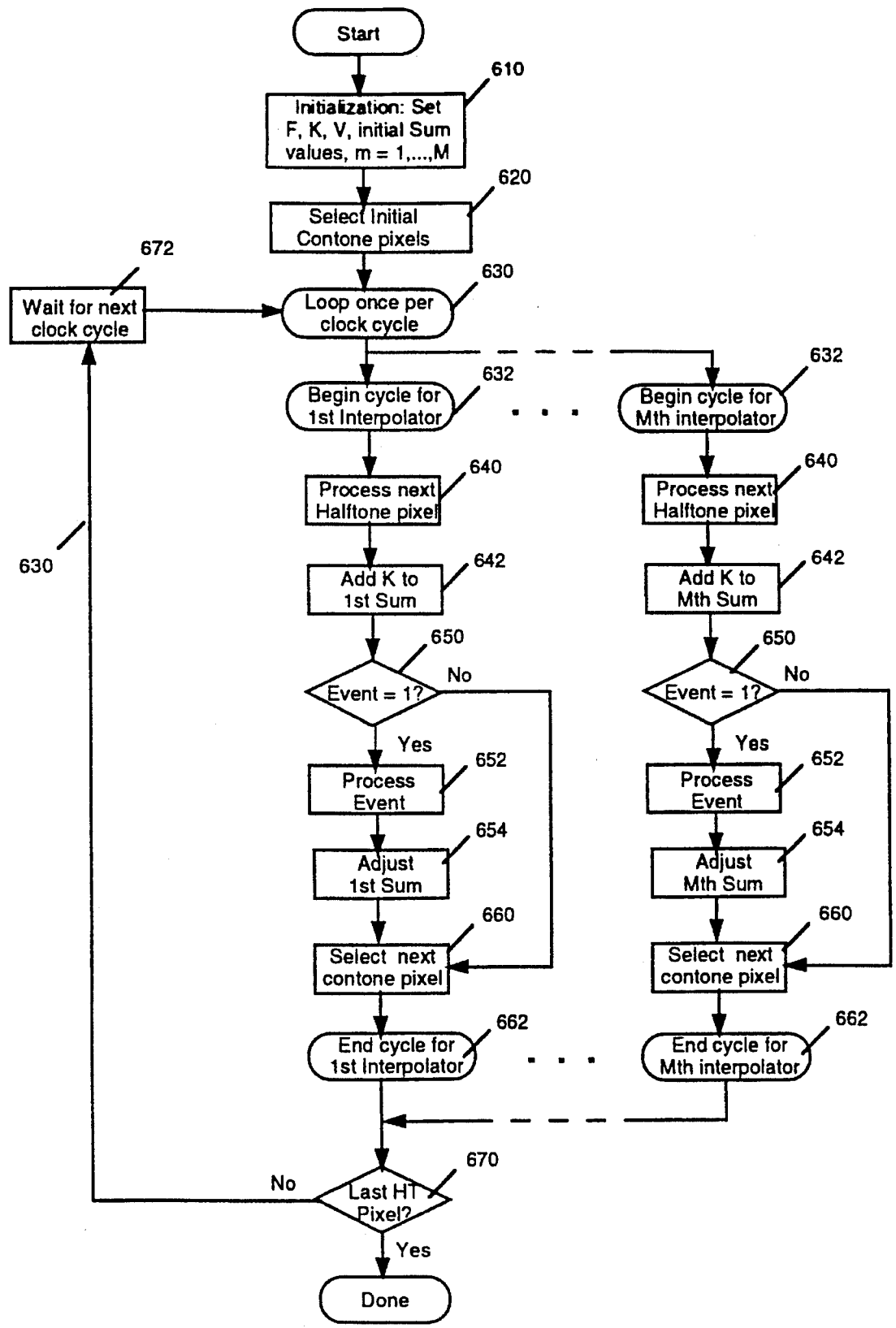
FIG. 6 is a flowchart for the processing sequence using multiple parallel accumulation for image scaling according to the method of the invention.

The processing sequence for parallel incremental interpolation for IMAGE SCALING is shown in the flowchart of FIG. 6 and will now be described in detail. After startup, the SCALE FACTOR F, ACCUMULATION CONSTANT K, and TRANSITION VALUE V are initialized (step 610), and the initial ACCUMULATION SUMS are determined, according to equations [7]. For each initial HALFTONE PIXEL corresponding to the initial ACCUMULATION SUMS, an initial CONTONE PIXEL is selected for HALFTONE PROCESSING (step 620). This selection can in general involve more than one CONTONE PIXEL.

The main processing loop 630 occurs once for each clock cycle, as long as there are HALFTONE PIXELS for which HALFTONE PROCESSING remains to be performed. For each clock cycle, the processing sequence 632 to 662 is carried out once for each of the M interpolators, m=1, . . . , M. Since these loops all occur within the same clock cycle, they take place in parallel as indicated in the diagram. For the mth interpolator therefore, the next HALFTONE PIXEL is identified and HALFTONE PROCESSING performed (step 640), using the appropriate CONTONE PIXEL with the THRESHOLD DATA VALUE corresponding to the identified HALFTONE PIXEL.

Following the HALFTONE PROCESSING 640, the ACCUMULATION CONSTANT K is added to the mth ACCUMULATION SUM in step 642, and the resulting ACCUMULATION SUM is compared with the TRANSITION VALUE in step 650, using the conditions of equations [9] or [11] given for each of the M ACCUMULATION SUMS. If no TRANSITION EVENT is indicated, the processing skips to step 660. Otherwise, a TRANSITION EVENT is generated in step 652. Depending upon the contone selection method being used, the ACCUMULATION SUM is adjusted in step 630 according to equations [10] (note that no adjustment is required by equations [11]). A TRANSITION EVENT selected during this or previous iterations is used in step 660 to select a new (or the same) CONTONE PIXEL for use in HALFTONE PROCESSING.

The sequence 632 to 662 is carried for each of the M interpolators in parallel as described above, after which the test of step 670 is carried out to determine whether or not there are HALFTONE PIXELS for which HALFTONE PROCESSING remains to be performed. If so, the loop 630 is repeated after signaling of the next clock cycle 672. When all HALFTONE PIXELS have been processed, the loop 630 exits at test 672.

The above processing can be generalized as a method for IMAGE SCALING and HALFTONE PROCESSING of HALFTONE PIXELS corresponding to a CONTONE IMAGE, and can be summarized in the following steps:

1. Using the CONTONE RESOLUTION and OUTPUT RESOLUTION to determine the ACCUMULATION CONSTANT and TRANSITION VALUE;
2. Determining an initial value of the ACCUMULATION SUM for each of M incremental interpolators, where M>1;
3. Selecting a CONTONE DATA VALUE for each of the M ACCUMULATOR SUMS of step (2.);
4. Selecting M HALFTONE PIXELS for processing with each of the M ACCUMULATOR SUMS;
5. Performing HALFTONE PROCESSING for each of the M selected HALFTONE PIXELS using the selected CONTONE DATA VALUES;
6. Adding the ACCUMULATION CONSTANT to each of the M ACCUMULATION SUMS, thereby generating a new value for each of the ACCUMULATION SUMS;
7. Determining a TRANSITION EVENT for each of M ACCUMULATION SUMS resulting from step (5.);
8. Using the TRANSITION EVENTS together with the TRANSITION VALUE to determine adjusted values for each of the M ACCUMULATION SUMS;
9. Using the TRANSITION EVENTS to select the same or a different CONTONE PIXEL for processing with each of the M ACCUMULATION SUMS; and,
10. Repeating steps (4.) through (9.) until HALFTONE PROCESSING has been completed for all HALFTONE PIXELS corresponding to the CONTONE IMAGE.

Having described in detail the method of the invention as applicable to IMAGE SCALING and HALFTONE PROCESSING using a general set of M parallel incremental interpolators, a preferred embodiment will now be described for the case M=2.

DESCRIPTION OF A PREFERRED EMBODIMENT

Figure 7:
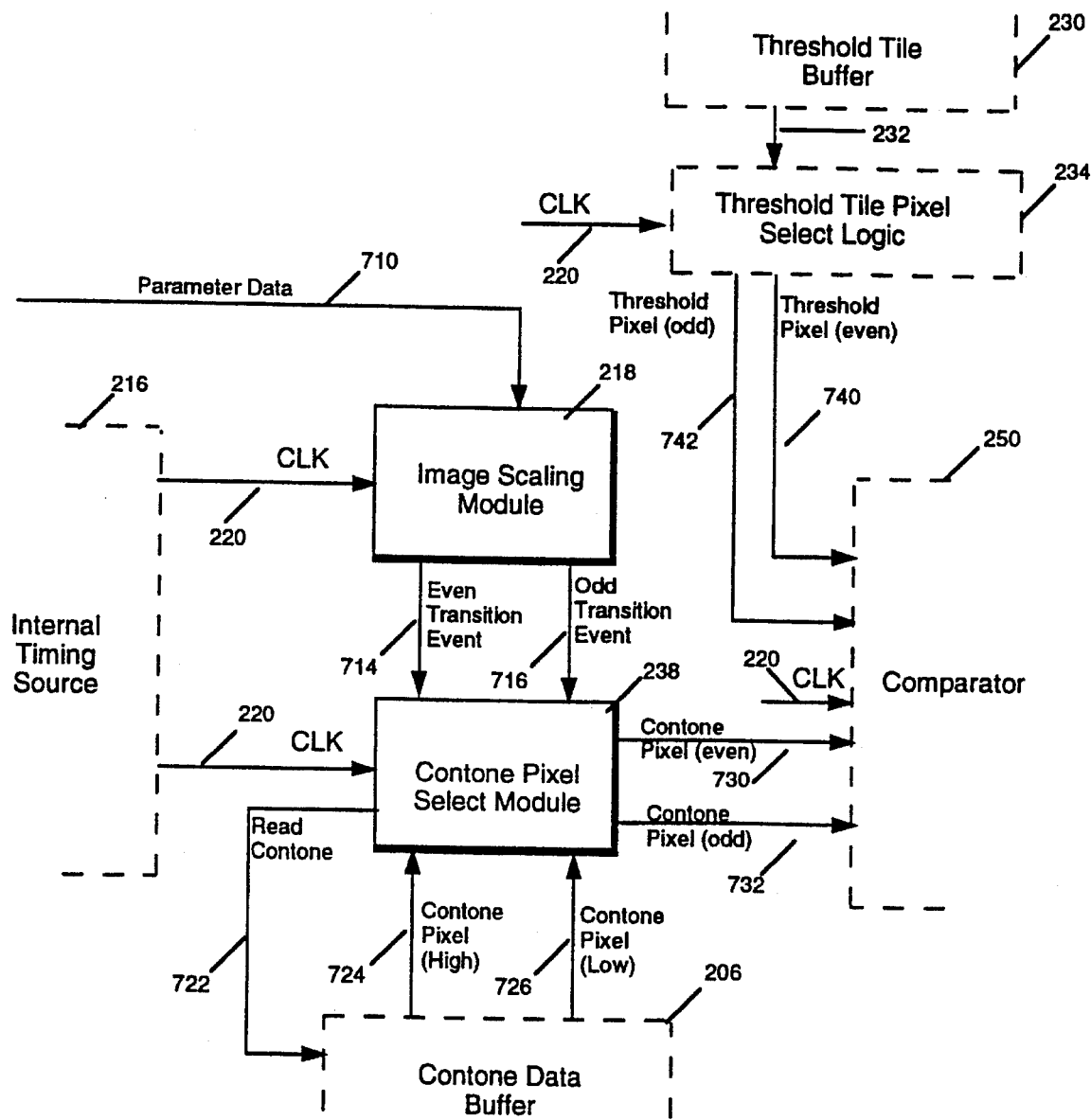
FIG. 7 shows the overall block diagram of the preferred embodiment of the invention as applied to image scaling in a RIP.

FIG. 7 is a block diagram of the preferred embodiment of the invention, using dual incremental interpolators for the IMAGE SCALING operation, and processing according to the sequence of flow chart of FIG. 6. Threshold data 122 and contone data 112 of FIG. 1 are assumed to have been previously written into the threshold tile buffer 230 and the contone data buffer 206. Parameter data 710 comprising the initial ACCUMULATOR SUMS and SCALE FACTOR is written into the image scaling module 712. A single clock signal 220 (designated as "CLK") is generated by the internal timing source 216 and distributed simultaneously to all modules.

The operation of the circuit is described as follows. The image scaling module 218 begins interpolating the parameter data 710 and generates a pair of TRANSITION EVENTS, designated as "Even" 714 and "Odd" 716, to the contone pixel select module 238. The contone pixel select module 238 generates a "read contone" signal 722 to request a pair of contone pixels, designated as "High" 724 and "Low" 726, from the contone data buffer 206. These pixels comprise two CONTONE DATA VALUES for the CONTONE PIXELS so defined at the CONTONE RESOLUTION.

The output of the contone pixel select module 238 is a pair of CONTONE PIXELS referred to as the CONTONE PIXEL (even) 730 and CONTONE PIXEL (odd) 732. The selection of output CONTONE PIXELS is based upon the TRANSITION EVENTS, input CONTONE PIXELS, the current CONTONE PIXELS being processed, and current state information maintained within the contone pixel select module 238. The selected output CONTONE PIXELS 730 and 732 are sent to the threshold comparator module 250 for comparison with THRESHOLD DATA VALUES 740 and 742, to generate the corresponding output halftone pixel values. The THRESHOLD DATA VALUES 740 and 742 are supplied for each clock cycle 220 by threshold tile pixel select logic 234 which retrieves threshold pixels 232 from threshold tile buffer 230.

Dual Serial Pipelined Interpolators

Figure 8:
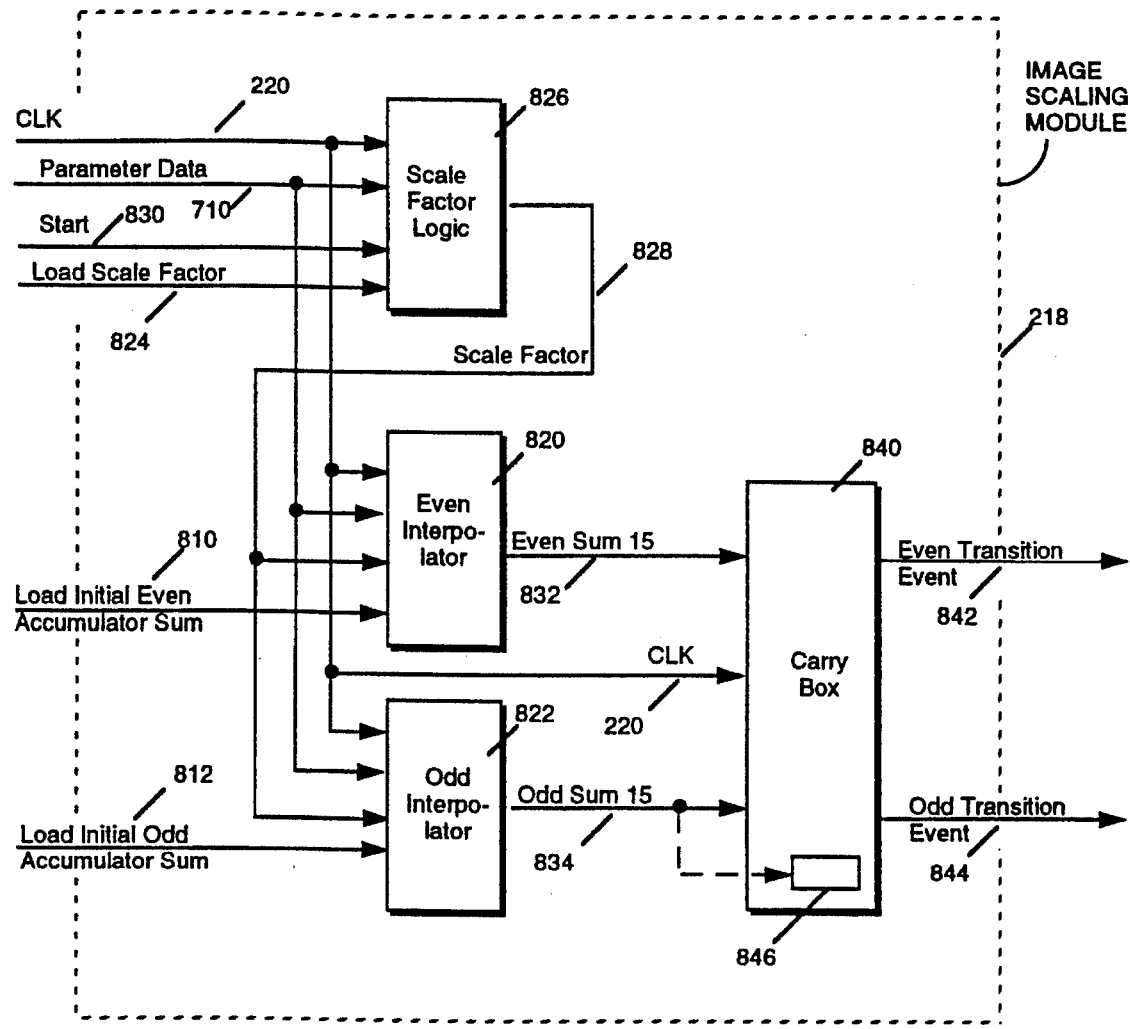
FIG. 8 details the image scaling module of the circuit of FIG. 7.

FIG. 8 is a block diagram of the image scaling module 218. Initial ACCUMULATION SUMS and SCALE FACTOR, are included in the parameter data 710. Internal registers contained within the interpolators, designated as "Even Interpolator" 820 and "Odd Interpolator" 822, are loaded with the corresponding initial ACCUMULATION SUMS using control signals 810 and 812. An internal register in the scale factor module 826 is similarly loaded with the SCALE FACTOR using control signal 824. This SCALE FACTOR is made available to the interpolators 820 and 822 for the first and subsequent iterations using the signal line 828.

The interpolators 820 and 822 are implemented using a substantially improved technique for removing the internal delays described previously for a traditional hardware interpolator. A hardware interpolator using this technique, herein designated by the defined term PIPELINED SERIAL INTERPOLATOR, has been described in detail in "Harmonic Frequency Synthesizer and FSK Modulator", Xilinx Application Note XAPP 009.000, Xilinx, Inc., San Jose, Calif., incorporated herein by reference. In a PIPELINED SERIAL INTERPOLATOR, the circuitry and data are arranged such that, after an initial startup time lasting (N–1) delays, all N stages perform useful computations simultaneously. As a result, only one delay is required per clock cycle to generate a valid sum and carry for every bit of the ACCUMULATION SUM. Therefore, use of a PIPELINED SERIAL INTERPOLATOR for incremental interpolation produces results which are equivalent to those of a traditional adder but at a rate which is N times faster (e.g., 16 times faster for a 16-bit adder). It will therefore be clear to one skilled in the art that its use is appropriate, although not essential, for successful implementation of the method and apparatus of the invention.

In accordance with the above, the even and odd interpolators 820 and 822 are implemented as PIPELINED SERIAL INTERPOLATORS producing a signal out of the most significant bit (bit 15) of the ACCUMULATION SUM (using 16-bit registers). An initialization period of 16 clock cycles is used as described above, after which each interpolator produces a valid bit 15 output for interpretation as a possible TRANSITION EVENT. The start signal 830 controls the initialization process, enabling the scale factor register bits in the sequence 0, 1, . . . , 15. Once enabled, they remain enabled from this point on.

After initialization the interpolators 820 and 822 each produce a "sum15" bit 832 and 834 for each clock cycle to be interpreted by the carry box 840. The carry box 840 accepts the "Even sum 15" 832 and "Odd sum 15" 834 signals and generates the corresponding TRANSITION EVENTS, designated "Even transition event" 842 and "Odd transition event" 844. In an internal register 846, it maintains the "odd sum 15" signal 834 received in the previous clock cycle. For each clock cycle, the TRANSITION EVENTS are generated in the carry box 840 using the conditions given in equation [11] for the case M=2 as follows:

[Even Transition Event]=[Even Sum 15].XOR. [Previous Odd Sum 15]   [12]

[Odd Transition Event]=[Odd Sum 15].XOR. [Even Sum 15]

The internal "previous odd sum 15" register 846 is initialized at startup to one.

Contone Pixel Select Module

Figure 9:
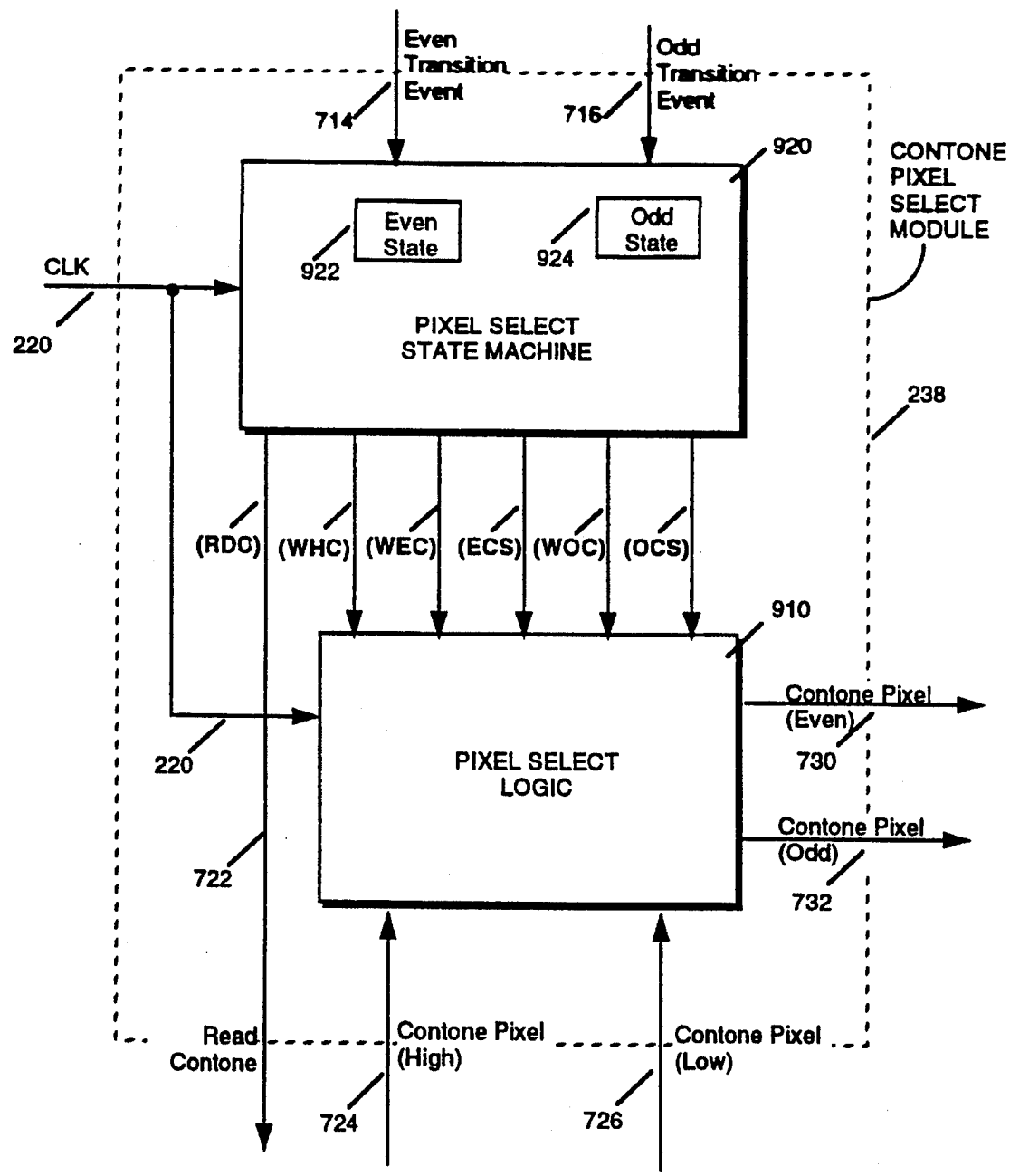
FIG. 9 details the contone pixel select module of the circuit of FIG. 7.

FIG. 9 is a block diagram of the contone pixel select module 238 of FIG. 7, comprising two main components, the pixel select logic 910 and a pixel select state machine 920. The pixel select logic 910 provides a data path with several registers and data selectors. Its function is to route the contone pixels 724 and 726 to the appropriate output (even and odd) contone pixels 730 and 732. The relationship between the registers and selectors is controlled by the pixel select state machine 920, which maintains two state bits 922 and 924. The first state bit is designated "even state" 922, and indicates whether the contone pixel (even) 730 was provided by a high (even state=1) or low (even state=0) input pixel. Similarly, the state bit "odd state" 924 indicates whether the contone pixel (odd) 732 was provided by a high (odd state= 1) or low (odd state=0) input pixel. Based upon the two state bits and the incoming transition events 714 and 716, decisions are made as to which data paths to enable, and when to read additional contone pixels from the contone data buffer 206, reflected in output control signals indicated in FIG. 9 as "read contone" (RDC), "write high contone" (WHC), "write even contone" (WEC), "even contone select code" (ECS), "write odd contone" (WOC), and "odd contone select code" (OCS).

Figure 10:
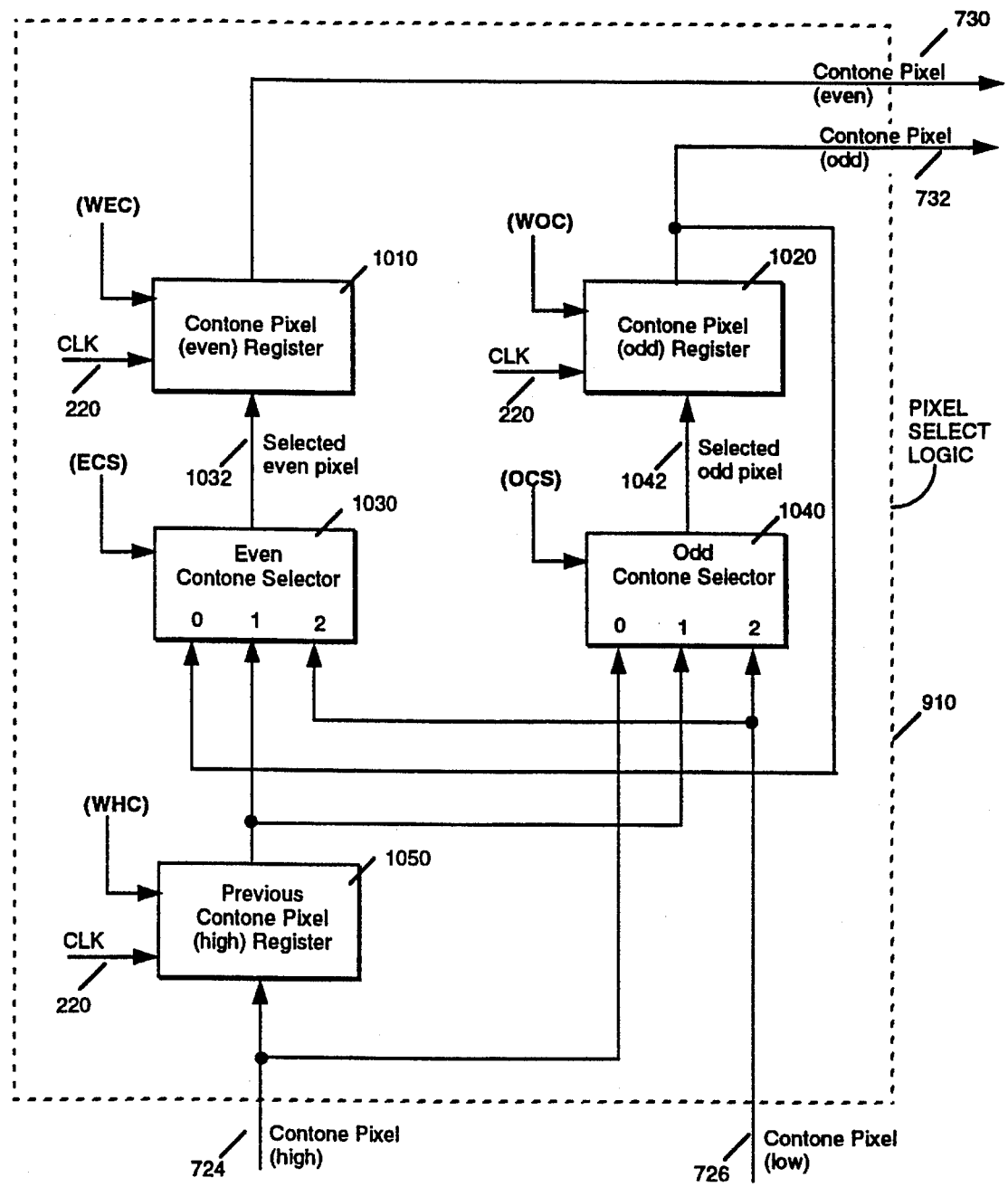
FIG. 10 is an expanded view of the pixel select logic of the circuit of FIG. 9.

FIG. 10 shows the pixel select logic 910 in greater detail. The output registers are the contone pixel (even) register 1010 and the contone pixel (odd) register 1020. These two registers are loaded with selected even and odd pixels 1032 and 1042 according to the contone select codes (ECS) and (OCS) and the pixels "0", "1", or "2" of the even or odd contone selectors 1030 and 1040 to determine the output contone pixels 730 and 732.

The operation of the pixel select logic 910 will now be described in detail. Following each clock signal (CLK) 220, the even and odd contone pixel registers 1010 and 1020 contain pixel data dependent upon the write and select code control signals described previously. For each, there exist four conditions, as summarized in TABLE 5 and TABLE 6.

The contone pixel (even) register 1010 will contain a pixel resulting from one of the four conditions given in TABLE 5.

TABLE 5

| CONTONE PIXEL (EVEN) REGISTER OUTPUT CONTENTS | | |
|---|---|---|
| Write Even Contone (WEC) | Even Contone Select Code (ECS) | Resulting New Even Pixel |
| 0 | — | Previous Even Pixel |
| 1 | 0 | Previous Odd Pixel |
| 1 | 1 | Previous High Pixel |
| 1 | 2 | New Low Pixel |

If the write even contone signal (WEC) is 0, the previous even CONTONE PIXEL is to be used for processing, i.e., the register 1010 is not reloaded with a new pixel. Otherwise, the even contone select code (ECS) determines which of several possible pixels to be used. The (ECS) codes of TABLE 5 are selected in the even contone selector 1030, and the result is sent via line 1032 to the even pixel contone register 1010.

In a similar manner, the contone pixel (odd) register 1020 will contain a pixel resulting from one of the four conditions, depending upon the write odd contone signal (WOC) and the odd contone select code (OCS), given in TABLE 6.

TABLE 6

CONTONE PIXEL (ODD) REGISTER OUTPUT CONTENTS

| Write Odd Contone (WOC) | Odd Contone Select Code (OCS) | Resulting New Odd Pixel |
|---|---|---|
| 0 | — | Previous Odd Pixel |
| 1 | 0 | New High Pixel |
| 1 | 1 | Previous High Pixel |
| 1 | 2 | New Low Pixel |

Following each clock signal 220, the previous contone pixel (high) register 1050 will contain the new contone pixel (high) 724 if write high contone (WHC) is true. This occurs when read contone (RDC) is also true, indicating that a new pair of CONTONE PIXELS should be read from the contone data buffer 206.

Pixel select State Machine

The pixel select state machine 920 is implemented as a set of gates and flip-flops which use the state bits 922 and 924 together with the input TRANSITION EVENTS 714 and 716 to determine the control signals described previously. The operation of the pixel select state machine 920 of FIG. 9 is defined by the truth table of TABLE 7.

TABLE 7

LOGIC TRUTH TABLE FOR PIXEL SELECT STATE MACHINE

| Current State | | Input Signals | | Next State | | Output Signals | | | | | |
|---|---|---|---|---|---|---|---|---|---|---|---|
| Even | Odd | Even | Odd | Even | Odd | RDC | WHC | WEC | ECS | WOC | OCS |
| 0 | 0 | 0 | 0 | 0 | 0 | 0 | 0 | 0 | — | 0 | — |
| 0 | 0 | 1 | 0 | 1 | 1 | 0 | 0 | 1 | 1 | 1 | 1 |
| 0 | 0 | 1 | 1 | 1 | 0 | 1 | 1 | 1 | 1 | 1 | 2 |
| 0 | 0 | 0 | 1 | 0 | 1 | 0 | 0 | 0 | — | 1 | 1 |
| 1 | 0 | 0 | 1 | 0 | 1 | 0 | 0 | 1 | 0 | 1 | 1 |
| 1 | 0 | 1 | 1 | 1 | 0 | 1 | 1 | 1 | 1 | 1 | 2 |
| 1 | 0 | 1 | 0 | 1 | 1 | 0 | 0 | 1 | 1 | 1 | 1 |
| 1 | 0 | 0 | 0 | 0 | 0 | 0 | 0 | 1 | 0 | 0 | — |
| 1 | 1 | 0 | 0 | 1 | 1 | 0 | 0 | 0 | — | 0 | — |
| 1 | 1 | 1 | 0 | 0 | 0 | 1 | 1 | 1 | 2 | 1 | 2 |
| 1 | 1 | 1 | 1 | 0 | 1 | 1 | 1 | 1 | 2 | 1 | 0 |
| 1 | 1 | 0 | 1 | 1 | 0 | 1 | 1 | 0 | — | 1 | 2 |
| 0 | 1 | 0 | 1 | 1 | 0 | 1 | 1 | 1 | 0 | 1 | 2 |
| 0 | 1 | 1 | 1 | 0 | 1 | 1 | 1 | 1 | 2 | 1 | 0 |
| 0 | 1 | 1 | 0 | 0 | 0 | 1 | 1 | 1 | 2 | 1 | 2 |
| 0 | 1 | 0 | 0 | 1 | 1 | 0 | 0 | 1 | 0 | 0 | — |

Given the four single-bit conditions representing the current state bits 922 and 924, and the input signals 714 and 716, the next state represented by the bits 922 and 924 is determined, along with the output signals (RDC), (WHC), (WEC), and (WOC), and the numerical values for the contone select codes (ECS) and (OCS). These values correspond to those described previously for TABLE 5 and TABLE 6.

The initial state of the pixel select state machine 920 is (0,1), corresponding to the even state bit 922=0 (low pixel) and the odd state bit 924=1 (high pixel).

Performance

It has been verified that the apparatus of the preferred embodiment of the invention processes two HALFTONE PIXELS within a single clock cycle. It should be borne in mind that there are many factors determining the overall performance of a RIP, including the rate at which the contone data can be supplied and the rate at which rasterized data can be extracted, the amount of additional processing required for initialization of the threshold array, etc. Based on the verification tests, however, it has been shown that the twofold increase in processing throughput is realizable within the limits of the above constraints.

Having described in detail a preferred embodiment of my invention, it will now be apparent to those skilled in the art that numerous modifications can be made therein without departing from the scope of the invention as defined in the following claims.

What I claim is:

1. A method for IMAGE SCALING and HALFTONE PROCESSING of HALFTONE PIXELS corresponding to a CONTONE IMAGE having a CONTONE RESOLUTION, said method comprising the following steps:

(A) Using the CONTONE RESOLUTION of said CONTONE IMAGE together with an OUTPUT RESOLUTION to obtain an ACCUMULATION CONSTANT and a TRANSITION VALUE;

(B) Determining an initial value for each of a plurality of ACCUMULATION SUMS;

(C) Selecting a CONTONE DATA VALUE for each of said plurality of ACCUMULATION SUMS;

(D) Identifying a HALFTONE PIXEL corresponding to each of said plurality of ACCUMULATION SUMS;

(E) Performing HALFTONE PROCESSING for each of said identified HALFTONE PIXELS using said selected CONTONE DATA VALUES;

(F) Adding said ACCUMULATION CONSTANT to each of said plurality of ACCUMULATION SUMS thereby generating new values for each of said plurality of ACCUMULATION SUMS;

(G) Determining a TRANSITION EVENT for each of said new values for each of said plurality of ACCUMULATION SUMS;

(H) Using said TRANSITION EVENTS together with said TRANSITION VALUE to determine an adjusted value for each of said plurality of ACCUMULATION SUMS;

(I) Using said TRANSITION EVENTS to select one or more CONTONE DATA VALUES of said CONTONE IMAGE for processing; and, (J) Repeating steps (D) through (I) until HALFTONE PROCESSING has been completed for all HALFTONE PIXELS corresponding to said CONTONE IMAGE.

2. The method of claim 1 wherein the TRANSITION VALUE is unity and the ACCUMULATION CONSTANT is a factor M times a SCALE FACTOR relating said CONTONE RESOLUTION to said OUTPUT RESOLUTION, said factor M being equal to the number of ACCUMULATION SUMS.

3. The method of claim 2 wherein said SCALE FACTOR is less than one.

4. The method of claim 1 wherein the number of ACCUMULATION SUMS can be expressed as an integer power of two, said integer being one or greater.

5. The method of claim 4 wherein the number of ACCUMULATION SUMS is two.

6. The method of claim 5 wherein the TRANSITION VALUE is unity and the ACCUMULATION CONSTANT is twice a SCALE FACTOR relating said CONTONE RESOLUTION to said OUTPUT RESOLUTION.

7. A method for INCREMENTAL INTERPOLATION to generate a sequence of events occurring at a first frequency from a sequence of events occurring at a second frequency, said method comprising the following steps:

(A) Using said first frequency together with said second frequency to obtain an ACCUMULATION CONSTANT and a TRANSITION VALUE;

(B) Determining initial values for each of a plurality of ACCUMULATION SUMS;

(C) Selecting an event of said first sequence of events for each of said plurality of ACCUMULATION SUMS;

(D) Selecting an event of said second sequence of events corresponding to each of said ACCUMULATION SUMS;

(E) Adding said ACCUMULATION CONSTANT to each of said plurality of ACCUMULATION SUMS thereby generating new values for each of said plurality of ACCUMULATION SUMS;

(F) Determining a TRANSITION EVENT for each of said new values for each of said plurality of ACCUMULATION SUMS;

(G) Using said TRANSITION EVENTS together with said TRANSITION VALUE to determine an adjusted value for each of said plurality of ACCUMULATION SUMS;

(H) Using said TRANSITION EVENTS to select one or more events of said first frequency sequence of events, and, (I) Repeating steps (D) through (H) until all events of said first frequency sequence of events have occurred.

8. The method of claim 7 wherein the TRANSITION VALUE is unity and the ACCUMULATION CONSTANT is a factor M times a SCALE FACTOR relating said CONTONE RESOLUTION to said OUTPUT RESOLUTION, said factor M being equal to the number of ACCUMULATION SUMS.

9. The method of claim 8 wherein said SCALE FACTOR is less than one.

10. The method of claim 7 wherein the number of ACCUMULATION SUMS can be expressed as an integer power of two, said integer being one or greater.

11. The method of claim 10 wherein the number of ACCUMULATION SUMS is two.

12. The method of claim 11 wherein the TRANSITION VALUE is unity and the ACCUMULATION CONSTANT is twice a SCALE FACTOR relating said first frequency to said second frequency.

13. The method of claims 1 or 7 wherein the TRANSITION VALUE is $2^n$ where n< N and N is the number of bits of precision of a data word representing said TRANSITION VALUE, said TRANSITION EVENT is generated by setting the nth bit of said data word, and said adjustment of said ACCUMULATION SUM is accomplished by resetting said nth bit of said data word.

14. The method of claims 1 or 7 wherein the TRANSITION VALUE is $2^N$ where N is the number of bits of precision of a data word representing said TRANSITION VALUE, said TRANSITION EVENT is generated by setting a carry bit indicating overflow of said data word, said adjustment of said ACCUMULATION SUMS is performed by resetting said carry bit of said data word, the remaining N bits of said data word representing said new initial value for the corresponding ACCUMULATION SUM.

15. The method of claim 1 wherein said TRANSITION EVENT is generated for each of said plurality of ACCUMULATION SUMS by comparison of a first designated bit of each of said plurality of ACCUMULATION SUMS with that of a second designated bit of one of said plurality of ACCUMULATION SUMS.

16. The method of claim 15 wherein said TRANSITION EVENT is generated for each of said plurality of ACCUMULATION SUMS by forming an EXCLUSIVE OR of a designated bit of each of said plurality of ACCUMULATION SUMS with the same bit of another of said plurality of ACCUMULATION SUMS.

17. The method of claim 15 wherein said comparison occurs between a first designated bit of at least one of said plurality of ACCUMULATION SUMS and that of a second designated bit of at least one of said plurality of ACCUMULATION SUMS occurring in a previous processing iteration.

18. An apparatus for IMAGE SCALING and HALFTONE PROCESSING of HALFTONE PIXELS corresponding to a CONTONE IMAGE having a CONTONE RESOLUTION, said apparatus comprising:

(A) Means for obtaining an ACCUMULATION CONSTANT and a TRANSITION VALUE using the CONTONE RESOLUTION of said CONTONE IMAGE together with the OUTPUT RESOLUTION of an OUTPUT DEVICE;

(B) Means for determining initial values for each of a plurality of ACCUMULATION SUMS;

(C) Means for selecting a CONTONE DATA VALUE for each of said plurality of ACCUMULATION SUMS;

(D) Means for identifying a HALFTONE PIXEL corresponding to each of said plurality of ACCUMULATION SUMS;

(E) Means for HALFTONE PROCESSING for each of said identified HALFTONE PIXELS using said selected CONTONE DATA VALUES;

(F) Means for adding said ACCUMULATION CONSTANT to each of said plurality of ACCUMULATION SUMS thereby generating new values for each of said plurality of ACCUMULATION SUMS;

(G) Means for determining a TRANSITION EVENT for each of said new values for each of said plurality of ACCUMULATION SUMS;

(H) Means for determining an adjusted value for each of said plurality of ACCUMULATION SUMS using said TRANSITION EVENTS with said TRANSITION VALUE; and, (I) Means for selecting one or more CONTONE DATA VALUES of said CONTONE IMAGE for processing.

19. The apparatus of claim 18 wherein said accumulation means is a plurality of SERIAL PIPELINED INTERPOLATORS.

20. The apparatus of claim 18 wherein said OUTPUT RESOLUTION is greater than said CONTONE RESOLUTION.

21. The apparatus of claim 18 wherein the number of ACCUMULATION SUMS can be expressed as an integer power of two, said integer being one or greater.

22. The apparatus of claim 21 wherein the number of ACCUMULATION SUMS is two.

23. An apparatus for INCREMENTAL INTERPOLATION for generating a sequence of events at a first frequency from a sequence of events occurring at a second frequency, said apparatus comprising:

(A) Means for obtaining an ACCUMULATION CONSTANT and a TRANSITION VALUE using said first frequency together with said second frequency;

(B) Means for determining initial values for each of a plurality of ACCUMULATION SUMS;

(C) Means for selecting an event of said first sequence of events for each of said plurality of ACCUMULATION SUMS;

(D) Means for selecting an event of said second sequence of events corresponding to each of said ACCUMULATION SUMS;

(E) Means for adding said ACCUMULATION CONSTANT to each of said plurality of ACCUMULATION SUMS thereby generating new values for each of said plurality of ACCUMULATION SUMS;

(F) Means for determining a TRANSITION EVENT for each of said new values for each of said plurality of ACCUMULATION SUMS;

(G) Means for determining an adjusted value for each of said plurality of ACCUMULATION SUMS using said TRANSITION EVENTS with said TRANSITION VALUE; and, (H) Means for selecting one or more events of said first frequency sequence of events.

24. The apparatus of claim 23 wherein said means for adding said ACCUMULATION CONSTANT to each of said plurality of ACCUMULATION SUMS comprises a plurality of SERIAL PIPELINED INTERPOLATORS.

25. The apparatus of claim 23 wherein said second frequency is greater than said first frequency.

26. The apparatus of claim 23 wherein the number of ACCUMULATION SUMS can be expressed as an integer power of two, said integer being one or greater.

27. The apparatus of claim 26 wherein the number of ACCUMULATION SUMS is two.

28. The apparatus of claim 22 wherein said means for determining a TRANSITION EVENT produces even and odd TRANSITION EVENTS and wherein said means for selecting a CONTONE DATA VALUE comprises:

(A) A pixel select state machine means responsive to said even and odd TRANSITION EVENTS for producing a plurality of control signals; and, (B) Pixel select logic means responsive to said plurality of control signals and to CONTONE DATA VALUES for producing even and odd CONTONE PIXELS.

29. The apparatus of claim 28 Wherein said pixel select state machine means uses the current state of said pixel select state machine means together with said even and odd TRANSITION EVENTS to produce the next state of said pixel select state machine means and control signals for controlling said pixel select logic means.

\* \* \* \* \*